June 3, 1924.                    S. FRENCH                    1,496,212
                            CIRCULAR SAW GUARD
                            Filed Feb. 6, 1923
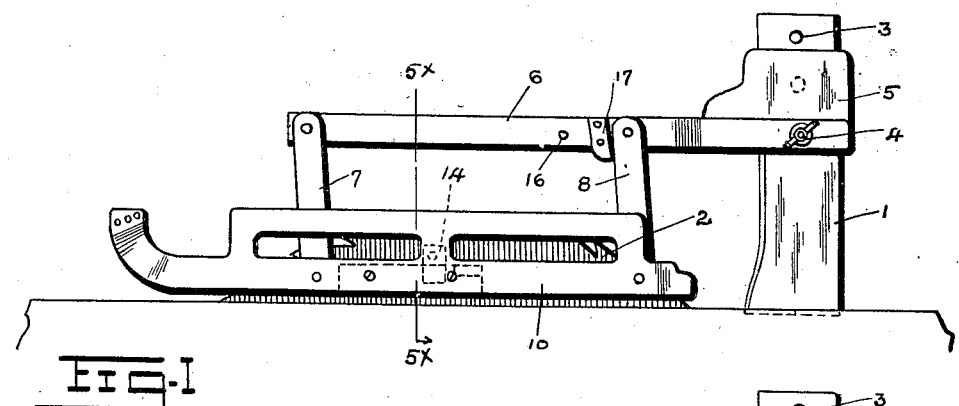
Fig.1
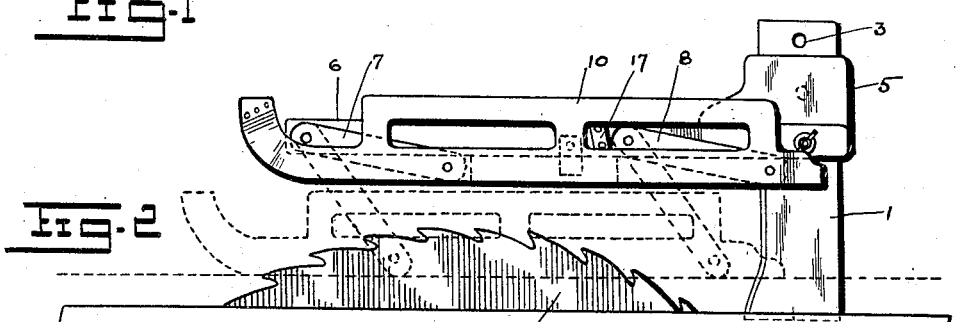
Fig.2
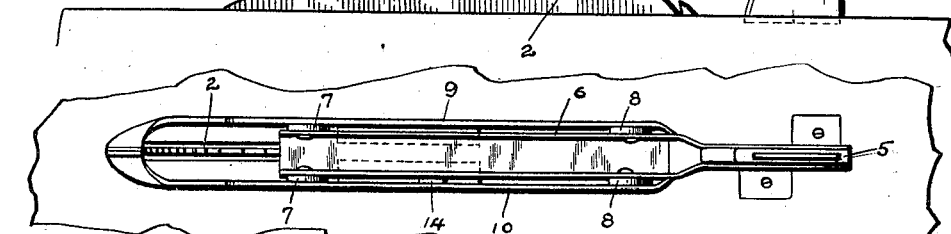
Fig.3
Fig.4     Fig.5
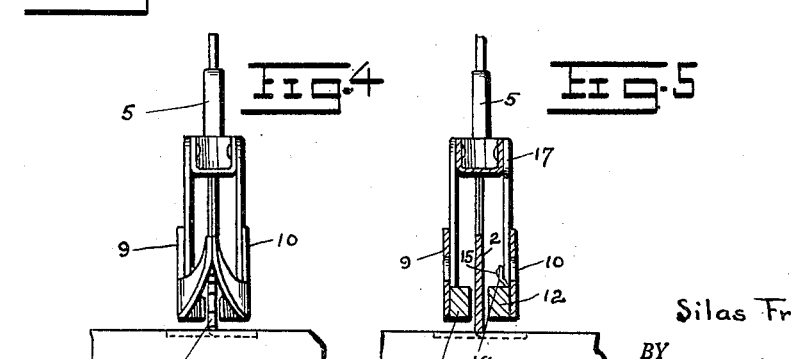
INVENTOR.
Silas French
BY
Frank Keiper
ATTORNEYS.

Patented June 3, 1924.

1,496,212

UNITED STATES PATENT OFFICE.

SILAS FRENCH, OF ROCHESTER, NEW YORK, ASSIGNOR OF FIFTEEN PER CENT TO JAMES F. SULLIVAN, OF ROCHESTER, NEW YORK.

CIRCULAR-SAW GUARD.

Application filed February 6, 1923. Serial No. 617,358.

*To all whom it may concern:*

Be it known that I, SILAS FRENCH, a citizen of the United States, residing at Rochester, in the county of Monroe and State of New York, have invented certain new and useful Improvements in Circular-Saw Guards, of which the following is a specification.

The object of this invention is to provide a new and efficient form of guards for circular saws.

These and other objects of this invention will be fully illustrated in the drawing, described in the specification and pointed out in the claims at the end thereof.

In the accompanying drawing:

Figure 1 is a side elevation of the saw guard as it appears when mounted on a saw table.

Figure 2 is a similar view of the guard with the guard placed in its inoperative position.

Figure 3 is a top plan view of the guard.

Figure 4 is a front elevation of the guard.

Figure 5 is a vertical sectional view of the guard, the section being taken on the line $5^x$—$5^x$ of Figure 1.

In the several figures of the drawing like reference numerals indicate like parts.

Saw guards for circular saws in order to be effective and efficient must operate automatically to keep the hand of the operator away from the revolving saw. In addition to this such a guard should also prevent any other accidents that may happen when the stock that is being sawed jams against the saw and the guide is thrown back toward the operator.

In the guard forming the subject matter of my present invention this is accomplished by making the guard in the form of an elongated open frame or cage that is mounted to freely swing on an arm supported by the upright guide member and spreader plate provided on the saw table behind the saw.

This upright guide member 1 or spreader plate is made up of flat metal stock and is mounted on the saw table behind the circular saw 2. The forward edge of the guide member or spreader plate 1 is wedge shaped and is adapted to enter the cut made by the saw in the stock so as to keep the two parts of the stock cut by the saw separated behind the saw. In the guide member or spreader plate 1 is provided a vertical row of holes 3, 3 through which a suitable clamping bolt 4 may be passed to clamp the rectangular sleeve 5 in place thereon at any desired elevation of the spreader plate.

The sleeve 5 is made to snugly fit over the spreader plate and when clamped thereto forms a rigid support for the guard arm 6. This arm comprises a channel of which a portion of the bottom is cut away at the rear and the sides brought together to embrace the sides of the sleeve 5. These sides of the channel are then fastened to the sleeve as above pointed out.

The guard proper is mounted to swing from the arm formed by this channel. This guard comprises the swinging arms 7, 7 and 8, 8 which are arranged in pairs and are mounted on either side of the channel at the front and near the rear thereof. At their lower end the arms have the guard rails 9 and 10 pivoted thereto to form an open cage within which the circular saw 2 is mounted to rotate. The forward end of each of these guard rails projects beyond the arm 6 and curves upwardly and inwardly until they meet. The extreme ends of the rails are then fastened together to close the front of the cage formed by the side rails to prevent the operator's finger from entering the cage during any sawing operations. The rear ends of the side rails slightly project beyond the swinging arms 8 and are also bent inwardly but do not close together so that ample space is left for the circular saw to project between them.

As illustrated in the figures, each of the side rails has its intermediate section built up with suitable openings provided in the upwardly extending section in order to protect a large portion of the sides of the saw without preventing the operator from watching the saw at any time during the sawing of lumber.

Fastened centrally on the inner side of each of the guide rails 9 and 10 are the guide blocks 11 and 12. These guide blocks are preferably made of wood and project toward each side of the saw with sufficient space between them for the saw to rotate between them. These guide blocks are provided for the purpose of holding the saw centrally of the cage formed by the guide rails 9 and 10 should the saw work loose from its shaft and start to shift to one or the other of the side rails. In this way the saw cannot possibly come in contact with the side rails at any time and wreck itself thereon.

In mounting the guide rails 9 and 10 to the arms 7 and 8 as above pointed out the guide rails swing on the arm in a parallel plane. Thus when the cage formed by the rails 9 and 10 is pushed to the rear the rails swing up toward the arm 6 maintaining their original parallel position to the arm at all times. In this way the guide rails 9 and 10 are adapted to rest and slide over the top of the lumber while it is being fed past the circular saw 2. This not only prevents the operator from getting his hand or fingers into contact with the saw but also holds the strip or strips of wood cut by the saw from raising up from the saw table or jamming into the opening in the table between the saw and the table. It further guides any small strips by holding them down on the table so that they cannot drop into the opening of the table where they would clog the exhaust pipe for carrying off the saw dust.

The operation of the guard is therefore as follows:

The guard is mounted on the spreader plate 1 so that the bottom of the cage is but slightly elevated from the saw table. In this position the cage of the guard encloses the front, top and sides of the portion of the saw that projects above the saw table. The space between the bottom of the guard and the surface of the saw table is made small enough so that the operator cannot possibly put his hand or fingers into the guard without first raising the guard. This position of the guard is governed by its mounting on the spreader plate 1 and can be adjusted to hold the guard in this proper position as above pointed out.

When the operator begins to feed lumber to the saw, the forward edge thereof first comes in contact with the upwardly curved ends of the guide rails of the cage. A further movement of the lumber to be sawed pushes the cage to the rear and in doing so the cage swings it up until the bottom of the cage of the guard slides on top of the lumber and rides over it as it is fed to the saw. This is illustrated in dotted lines in Figure 2. The cage of the guard continues to rest on top of the lumber during the cutting operation but swings back to its normal position as soon as the lumber has passed from under it after the cutting operation thereon has been completed. In this way the hands of the operator are at no time exposed to the saw which prevents the operator's hand from coming in contact with the saw.

For the purpose of moving the saw guard out of the way and holding it in a position in which the saw 2 is exposed on the saw table so that it can be adjusted or replaced, locking means are provided on the guard.

This locking means comprises a spring finger 14 mounted to the inside of one of the rails of the cage. This spring finger has a blister 15 formed on the outer end thereof and this blister is adapted to engage in the depression 16 formed in the side of the channel of the arm 6. As illustrated in Figure 2 the spring finger 14 with its blister 15 engages the depression 16 in the arm 6 when the cage has been pushed back until the cage has been swung up to embrace the arm 6 so that the arm and the cage of the guard form but one rigid member with each other that projects forwardly from the spreader plate at an elevation well above the circular saw.

For the purpose of preventing the cage of the guard from swinging forwardly beyond the normal position, a stop 17 is provided. This stop comprises a shoulder formed on one side of the arm 6 in front of one of the swinging arms 8. This shoulder permits the swinging of the arm to the rear, that is toward the spreader plate 1, but arrests any movement to the front as soon as the swinging arm has come in contact with it which is the case when the arm 8 is in its vertical position.

I claim:

1. In a guard for circular saws, the combination of a horizontal arm, swinging arms pivoted on said horizontal arm, a pair of guide rails pivoted on said swinging arms, said guide rails curving upwardly and inwardly and being connected at the front ends thereof, said guide rails curving inwardly at the rear ends thereof leaving a small opening between them, spacing blocks mounted to said guide rails on the inside thereof, said spacing blocks being adapted to hold the circular saw centrally of said guide rails, said guide rails being adapted to telescope over said horizontal arm, a spring finger carried by one of said guide rails, a depression in said horizontal arm, said spring finger being adapted to engage said depression in said horizontal arm and hold said guide rails in a telescopic position with said horizontal arm above the circular saw.

2. In a guard for circular saws, the combination of a horizontal arm, swinging arms pivoted on said horizontal arm, a pair of guide rails pivoted on said swinging arms, said guide rails curving upwardly and inwardly and being connected at the front ends thereof, said guide rails curving inwardly at the rear ends thereof leaving a small opening between them, spacing blocks mounted to said guide rails on the inside thereof, said spacing blocks being adapted to hold the circular saw centrally of said guide rails, said guide rails being adapted to telescope over said horizontal arm, a spring finger carried by one of said guide rails, a depression in said horizontal arm, said spring finger being adapted to engage said depression in said horizontal arm and hold said guide rails in a telescopic position with said horizontal arm above the circular saw, means for vertically adjusting said horizontal arm above the saw table.

In testimony whereof I affix my signature.

SILAS FRENCH.